US011961503B2

(12) United States Patent
Christoph

(10) Patent No.: US 11,961,503 B2
(45) Date of Patent: Apr. 16, 2024

(54) AUTOMATIC NOISE CONTROL

(71) Applicant: Harman Becker Automotive Systems GmbH, Karlsbad-Ittersbach (DE)

(72) Inventor: Markus Christoph, Straubing (DE)

(73) Assignee: HARMAN BECKER AUTOMOTIVE SYSTEMS GMBH, Karlsbad-Ittersbach (DE)

(*) Notice: Subject to any disclaimer, the term of this patent is extended or adjusted under 35 U.S.C. 154(b) by 193 days.

(21) Appl. No.: 17/597,289

(22) PCT Filed: Jul. 2, 2019

(86) PCT No.: PCT/EP2019/067726
§ 371 (c)(1),
(2) Date: Dec. 30, 2021

(87) PCT Pub. No.: WO2021/001026
PCT Pub. Date: Jan. 7, 2021

(65) Prior Publication Data

US 2022/0319488 A1 Oct. 6, 2022

(51) Int. Cl.
*A61F 11/06* (2006.01)
*G10K 11/178* (2006.01)
*G10K 11/16* (2006.01)

(52) U.S. Cl.
CPC .. *G10K 11/17854* (2018.01); *G10K 11/17823* (2018.01); *G10K 11/17825* (2018.01); *G10K 11/17881* (2018.01); *G10K 2210/12821* (2013.01); *G10K 2210/3026* (2013.01); *G10K 2210/3027* (2013.01); *G10K 2210/3028* (2013.01); *G10K 2210/3044* (2013.01); *G10K 2210/501* (2013.01)

(58) Field of Classification Search
CPC ....... G10K 11/17854; G10K 11/17823; G10K 11/17825; G10K 11/17881; G10K 2210/12821; G10K 2210/3026; G10K 2210/3027; G10K 2210/3028; G10K 2210/3044; G10K 2210/501
USPC .............................................. 381/71.11, 71.1
See application file for complete search history.

(56) References Cited

U.S. PATENT DOCUMENTS 9,870,763 B1 * 1/2018 Christian ............. G10K 11/178

FOREIGN PATENT DOCUMENTS

EP 3159891 B1 8/2018
WO 2018073626 A1 4/2018
(Continued)

OTHER PUBLICATIONS

ISA European Patent Office, International Search Report and Written Opinion Issued in Application No. PCT/EP2019/067726, dated Mar. 20, 2020, WIPO, 18 pages.

*Primary Examiner* — Ammar T Hamid
(74) *Attorney, Agent, or Firm* — McCoy Russell LLP

(57) ABSTRACT

Methods and systems are provided for an automatic noise control system. Automatic noise control includes evaluating an amplitude of an acceleration acting on an acceleration sensor and generating a reference signal representative of the amplitude of the acceleration, the acceleration being representative of unwanted noise sound generated by a noise source, filtering the reference signal with a noise control transfer function to generate an anti-noise signal, and converting with a loudspeaker the anti-noise signal into anti-noise sound.

13 Claims, 4 Drawing Sheets

(56) References Cited

FOREIGN PATENT DOCUMENTS

| | | | | |
|---|---|---|---|---|
| WO | 2019106077 | A1 | 6/2019 | |
| WO | WO-2019106077 | A1 * | 6/2019 | ....... G10K 11/17817 |

* cited by examiner

AUTOMATIC NOISE CONTROL

CROSS-REFERENCE TO RELATED APPLICATIONS

The present application is a U.S. National Phase of International Patent Application Serial No. PCT/EP2019/067726 entitled "AUTOMATIC NOISE CONTROL," and filed on Jul. 2, 2019. The entire contents of the above-referenced application are hereby incorporated by reference for all purposes.

BACKGROUND

1. Technical Field

The disclosure relates to a system and method (generally referred to as a "system") for automatic noise control.

2. Related Art

Sound is a pressure wave which consists of alternating periods of compression and expansion. For noise-cancellation, a sound wave is emitted with the same amplitude but with phases of compression and expansion that are inverted to the original sound. The waves combine to form a new wave in a process called interference and effectively cancel each other out—an effect which is called destructive interference. Modern active noise control (ANC) is commonly achieved with the use of analog and/or digital signal processing. Adaptive algorithms can be designed to analyze the waveform of the background noise and, based on the specific analog or digital signal processing, can generate a signal that will either phase shift or invert the polarity of the original signal. This inverted signal is then amplified and a transducer creates a sound wave directly proportional to the amplitude of the original waveform, but with inverse phase, creating destructive interference. This effectively reduces the amplitude of the perceivable noise.

Land based vehicles, when driven upon roads and other surfaces, generate low frequency noise known as road noise. As the wheels are driven over the road surface, the road noise is at least in part transmitted through vehicle components such as tires, wheels, hubs, chassis components, suspension components and the vehicle body, and can be heard in the vehicle cabin. In order to reduce the vibrations in the vehicle components and hence road noise experienced by cabin occupants, ANC systems of the kind described above may be employed. In the field, situations may occur in which ANC systems installed in vehicles tend to self-generate unwanted sound. It is desired to suppress or avoid such unwanted sound.

SUMMARY

An automatic noise control system includes an acceleration sensor configured to evaluate an amplitude of an acceleration acting thereon and to generate a reference signal representative of the amplitude of the acceleration, the acceleration being representative of unwanted noise sound generated by a noise source, and a noise control filter operatively coupled with the acceleration sensor and configured to filter the reference signal with a noise control transfer function to generate an anti-noise signal. The system further includes a loudspeaker operatively coupled with the noise control filter and configured to convert the anti-noise signal into anti-noise sound, and a microphone configured to receive the noise sound after being transferred via a primary path according to a primary path transfer function from the noise source to the microphone and the anti-noise sound after being transferred via a secondary path according to a secondary path transfer function from the loudspeaker to the microphone, and further configured to convert a sum of the received noise sound and the received anti-noise sound into an error signal. The system further includes a filter controller operatively coupled with the noise control filter, the microphone and the acceleration sensor, and configured to control the noise control transfer function of the noise control filter based on the error signal from the microphone and the filtered or unfiltered reference signal from the acceleration sensor so that the anti-noise sound after being transferred via the secondary path is the inverse of the noise sound after being transferred via a primary path. The system further includes a leakage controller operatively coupled with the filter controller, the acceleration sensor and the microphone, and configured to apply via the filter controller to the noise control transfer function of the noise control filter a leakage based on the error signal from the microphone and the filtered or unfiltered reference signal from the acceleration sensor.

An automatic noise control method includes evaluating an amplitude of an acceleration acting on an acceleration sensor and generating a reference signal representative of the amplitude of the acceleration, the acceleration being representative of unwanted noise sound generated by a noise source, filtering the reference signal with a noise control transfer function to generate an anti-noise signal, and converting with a loudspeaker the anti-noise signal into anti-noise sound. The method further includes receiving with a microphone the noise sound after being transferred via a primary path according to a primary path transfer function from the noise source to the microphone and the anti-noise sound after being transferred via a secondary path according to a secondary path transfer function from the loudspeaker to the microphone and converting with the microphone a sum of the received noise sound and the received anti-noise sound into an error signal. The method further includes controlling the noise control transfer function based on the error signal from the microphone and the filtered or unfiltered reference signal from the acceleration sensor so that the anti-noise sound after being transferred via the secondary path is the inverse of the noise sound after being transferred via a primary path, and applying via the filter controller to the noise control transfer function of the noise control filter a leakage based on the error signal from the microphone and the filtered or unfiltered reference signal from the acceleration sensor.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Investigations have revealed that unwanted sound, which is self-generated by ANC systems (and methods) installed in vehicles, often occurs when a situation with high ambient-noise levels (e.g., driving on a cobbled road) turns into a situation with low ambient-noise levels (e.g., driving on a new tarmac road). Closer investigations into the filter coefficients of noise control filters operated in the above-described situations showed that the coefficients tend to be such that the filters provide less amplification/higher attenuation in low noise situations and provide more amplification/less attenuation with increasing noise.

Figure 1:
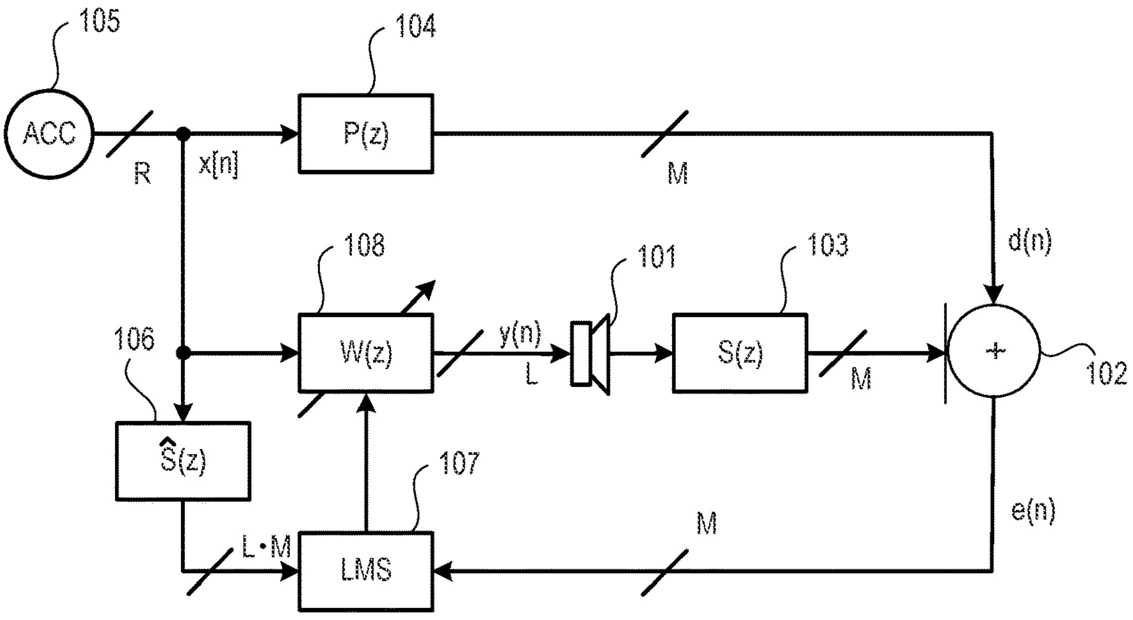
FIG. 1 is a schematic diagram illustrating an exemplary basic single-channel or multi-channel feedforward ANC system using a FXLMS algorithm.

Referring to FIG. 1, an exemplary single or multichannel ANC system may include a multiplicity L≥1 of loudspeakers 101 as actuators that convert electrical signals into sound waves and a multiplicity M of error microphones 102 as sensors that convert sound waves into electrical signals. Secondary paths 103 transfer acoustic waves from the loudspeakers 101 to the error microphones 102 which also receive via primary paths 104 disturbing sound d[n] based on reference signals x[n] originating from a noise signal source 105. The sound waves transferred by the primary paths 104 with primary path transfer functions P(z) and the secondary paths with secondary path transfer functions S(z) interfere with each other, which can be described by summation operations.

The disturbing sound waves d[n] correspond to R≥1 reference signals x[n] according to the primary path transfer functions P(z). The R reference signals x[n] are, optionally, filtered by secondary path modeling filters 106 with transfer functions (z) that model the secondary path transfer functions S(z) to provide L·M filtered reference signals. The M≥1 signals from the M≥1 microphones 102, herein referred to as error signals e[n], represent the performance of the system, e.g., the cancellation performance in view of the L·M filtered reference signals, and are supplied to a filter controller 107 which generates control signals for updating transfer functions W(z) of controllable noise control filters 108, i.e., for updating the filter coefficients thereof. The noise control filters 108 filter the R reference signals x[n] with the transfer functions W(z) and are connected upstream of the loudspeaker 101 to supply loudspeaker signals y[n] thereto. The transfer functions P(z), S(z) und $\hat{S}(z)$ can be seen as filter matrices and the signals x[n], y[n], d[n], e[n] und y[n] can be seen as signal vectors. Although no distinction is made in FIG. 1 between acoustic domain and electrical domain, all elements and operations shown are in the electrical domain except the primary path 104, the secondary path 103 and the acoustic interference at the microphones 102, which are in the acoustic domain. Loudspeakers 101 and error microphones 102 can be seen as converters from the electrical domain into the acoustic domain and from the acoustic domain into the electrical domain, respectively.

The primary paths 104 and secondary paths 103 have a spectral behavior that changes over time. For example, the secondary paths 103 are modified whenever something impacts or changes the acoustics. Thus, the matrix of secondary path transfer functions S(z) are time dependent. The update of the corresponding matrix of transfer functions W(z) of the noise control filters 108 is performed, in this example, according to a Filtered X Least Mean Square (FX-LMS) algorithm, in which X represents an input signal, e.g., the R reference signals x[n]. However, any other appropriate algorithm may be used as well.

Investigations have further revealed that in ANC systems that employ acceleration sensors, e.g., for picking up the reference signals, the characteristics of the acceleration sensors have a significant bearing on the performance of the ANC systems, particularly on the generation of disturbing signals by the ANC systems themselves. As can be seen from FIG. 1, the R≥1 reference signals x[n], which are provided by acceleration sensors (e.g., as sources 105) in the instant example, are filtered with the transfer functions W(z), which means that the amplitudes of the reference signals x[n] are weighted with (frequency-dependent) weights determined by the filter coefficients of the noise control filters 108. For example, the signals output by the noise control filters 108 are increasingly amplified or decreasingly attenuated, as the case may be, when the weights determined by the filter coefficients increase. As a result, the levels of the L signals y[n] supplied to the L loudspeakers by the noise control filters 108 increase accordingly and so does the level of the anti-noise sound that corresponds to the sound broadcasted by the loudspeakers via the secondary paths to listening positions. The listening positions are herein defined by the positions of the M microphones. Filter coefficients for higher amplification/lower attenuation occur when the original noise and the anti-noise adapted thereto have higher signal levels.

If acceleration sensors are employed that have a smaller dynamic range (i.e., the range between minimum and maximum amplitude) and/or are otherwise inappropriate (e.g., exhibit an incorrect bias point and/or an inappropriate acceleration sensing range), and if the original noise changes from higher signal levels to lower signal levels, the coefficients may freeze for a certain time at (high) weights that correspond to a high-level anti-noise signal such as in response to a high-level original noise that occurred before, but which is now low-level. This means that, in this situation, the generated anti-noise does not match the original noise, and moreover has a higher level than the original noise, which is perceived by a listener as the disturbing sound. In the field, acceleration sensors with a broader dynamic range are either not available, e.g., for automotive applications and their requirements, or are too costly so that common ANC systems that employ such types of acceleration sensors tend to generate disturbing sound by themselves.

As outlined above, an ANC system that has adapted to a high-level noise situation (e.g., driving on a cobbled road) exhibits filter coefficients that cause higher amplification or lower attenuation onto the reference signal x[n]. These accordingly adapted filter coefficients and, thus, the adapted amplification/attenuation are maintained for a certain time period after a high-level noise situation changes into a low-level noise situation. As, e.g., in automotive applications, the sound levels of high-level noise situations and low-level noise situations are often not very different at lower frequencies, here the change of the noise situation has essentially no adverse effect. However, at midrange and higher frequencies the levels differ significantly in different noise situations, which facilitates the generation of unwanted sounds by the ANC system and which is referred to herein as waterbed effect. To avoid such generation of unwanted sound, the adaptation process is kept active, which allow to bring the filter coefficients quickly to the required values. Various approaches to expedite the adaptation process may be used alternatively or in different combinations.

For a better understanding, the following description refers to L=1, M=1, and R=1, i.e., to a single-channel system. However, systems where at least one of L, M and R is greater than one (multi-channel systems) can easily be derived by combining L M R single channel systems.

Figure 2:
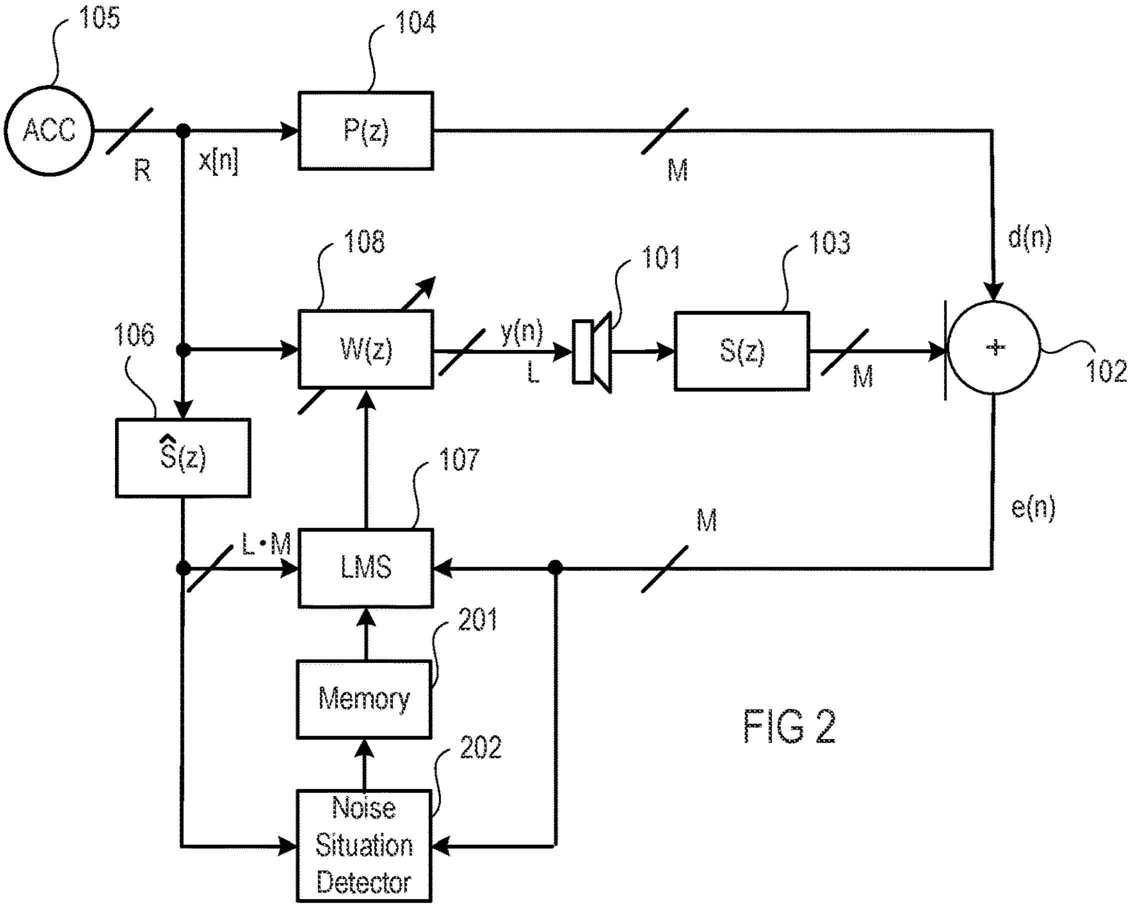
FIG. 2 is a schematic diagram illustrating the ANC system shown in FIG. 1 with an additional update controller.

In one implementation shown in FIG. 2, a memory 201 for storing various sets of predetermined filter coefficients and a noise situation detector 202 for detecting various different noise situations are added to the ANC system shown in FIG. 1. Further, the filter controller 107 is connected to the memory 201 and the noise situation detector 202, and is further able to copy some or all of the stored sets of predetermined filter coefficients into the noise control filter 108 if a change in the noise situation is detected by or based on the noise situation detector 202. The stored sets of predetermined filter coefficients may, for example, represent commonly occurring noise situations, or may be previously adapted sets for specific or similar noise situations. The selection of the stored sets of predetermined filter coefficients that are actually copied into the noise control filter 108 may be dependent on or independent (e.g., performed on a regular basis) from the detected noise situation. Alternatively, if a change in the noise situation is detected, the actual sets of coefficients may be modified in an appropriate manner, e.g., by dividing or multiplying the current sets of coefficients with a constant or variable, frequency dependent or independent parameter. The noise situation detector 202 may, for example, employ artificial intelligence to evaluate the sound spectrum of different noise situations and to reliably identify the different noise situations based thereon.

In another exemplary implementation, a spectral (frequency dependent) leakage, e.g., represented by a leakage factor λ(f), is applied to the transfer function W(z) of the noise control filter 108 during update of the transfer function W(z). The transfer functions W(z), also referred to as transfer function $W(e^{j\omega t}, n+1)$, with applied leakage can be described as follows:

$$W(e^{j\omega t}, n+1) = W(e^{j\omega t}, n)\cdot\lambda(e^{j\omega t}, n) + \frac{\mu(e^{j\omega t}, n)}{P_{XX}(e^{j\omega t}, n)+\Delta}\cdot E(e^{j\omega t}, n)\cdot X_F^*(e^{j\omega t}, n),$$

wherein n is a discrete point in time, w is an angular frequency, t is a time parameter, $\lambda(e^{j\omega t}, n)$ is a frequency and time dependent leakage factor, $\mu(e^{j\omega t}, n)$ is a adaptation step size, $P_{xx}(e^{j\omega t},n)$ is the level of the reference signal(s) x[n], Δ is a frequency dependent or independent fix factor. This serves to avoid divisions by zero or a small value in order to keep the resulting update term within a certain robust range. $E(e^{j\omega t}, n)$ is the spectrum of the error signal(s) e[n], and $X^*_F(e^{j\omega t},n)$ is the spectrum of the filtered reference signal(s) x[n]. In view of the above findings that, in most cases and even with reference signals that have low signal levels, lower frequencies do not significantly contribute to the generation of unwanted signals (corresponding to unwanted sounds), the leakage may be additionally made frequency dependent. Further, the leakage may additionally or alternatively be made dependent on the current level of the respective reference signal x[n], i.e., the signal from the respective acceleration sensor. The dependency on the current reference signal level implies a time dependency so that, for example, at least at higher frequencies, leakage is applied to a higher degree at lower reference signal levels than at higher reference signal levels where the leakage factor may be even zero, as the case may be.

Figure 3:
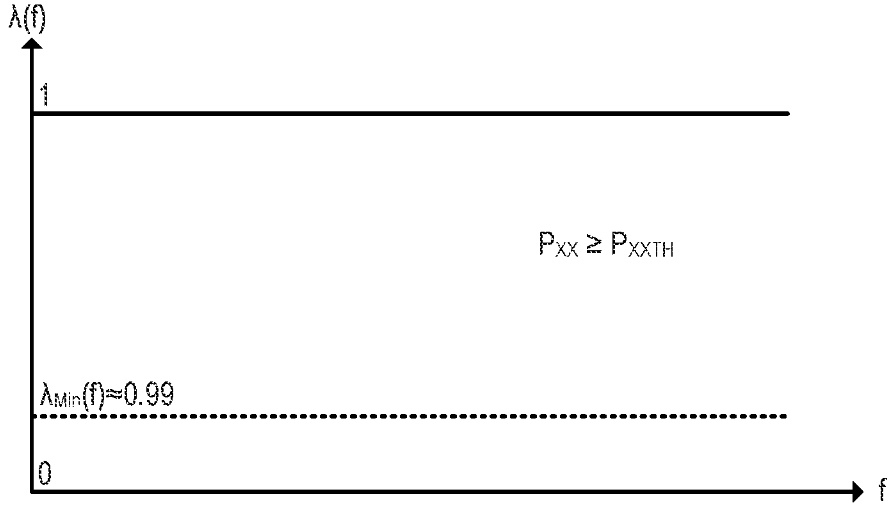
FIG. 3 is a leakage-factor frequency diagram illustrating the frequency-dependent leakage factor λ(f) when a level of the reference signal(s) is equal or greater than a threshold level.

FIG. 3 is a leakage-factor frequency diagram that illustrates the frequency-dependent leakage factor λ(f) if $P_{XX} \geq P_{XXTH}$, which represents a situation with high reference signal levels and, thus, the most common situation in the field. As can be seen, the leakage factor λ(f) is constant over frequency with a value of 1 and thus higher than a predetermined minimum leakage factor $\lambda_{Min}(f)$ with a value of, for example, 0.99. $P_{XXTH}$ designates a predetermined threshold level.

Figure 4:
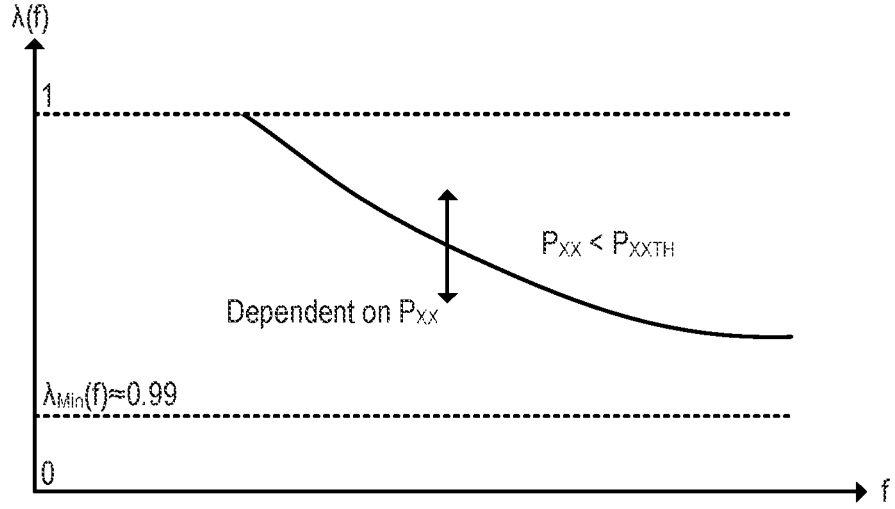
FIG. 4 is a leakage-factor frequency diagram illustrating the frequency-dependent leakage factor λ(f) when the level of the reference signal(s) is much smaller than the threshold level.

FIG. 4 is a leakage-factor frequency diagram that illustrates the frequency-dependent leakage factor λ(f) if $P_{XX} < P_{XXTH}$, which represents a situation with medium reference signal levels. As can be seen, the leakage factor λ(f) is at the value 1 for lower frequencies and decreases to values slightly above 0.99 over frequency, dependent on the level and, optionally, on the spectral shape (and limits) of $P_{XX}$.

Figure 5:
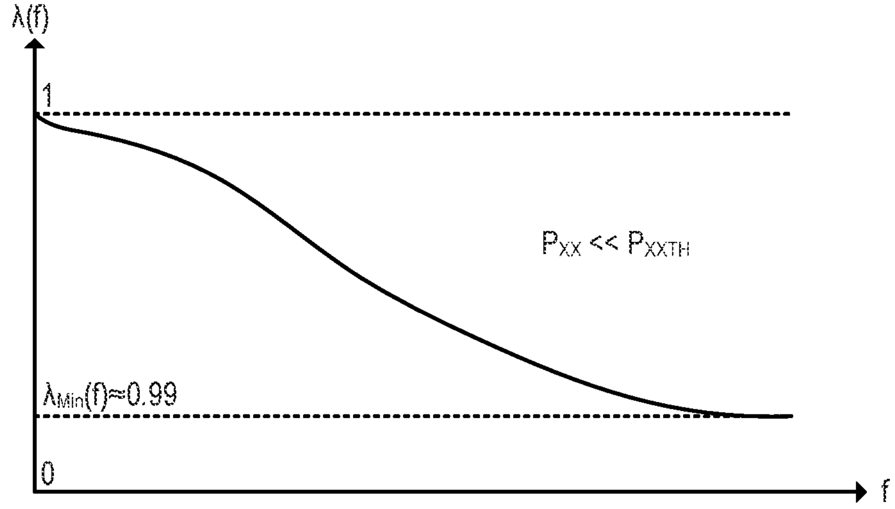
FIG. 5 is a leakage-factor frequency diagram illustrating the frequency-dependent leakage factor λ(f) when the level of the reference signal(s) is much smaller than the threshold level.

FIG. 5 is a leakage-factor frequency diagram that illustrates the frequency-dependent leakage factor λ(f) when $P_{XX} \ll P_{XXTH}$, which represents a situation with very small reference signal levels. As can be seen, the leakage factor λ(f) is 1 at the lowest frequency and decreases (and is limited) to 0.99 at the highest frequency dependent on $P_{XX}$.

From FIGS. 3-5 it can be deduced that the difference between the current level of the reference signals $P_{XX}$ and the predetermined threshold level $P_{XXTH}$ may be used to scale a frequency-dependent, but in its shape constant, leakage, which means the curve of the leakage factor λ(f) can be moved, while maintaining its shape, vertically in the diagrams shown in FIGS. 3-5 within a range with an upper limit at the value 1 and a lower limit at the predetermined minimum leakage factor $\lambda_{Min}(f)$. Thus, due to the leakage, at lower noise levels the filter coefficients are forced to change in a manner such that the accordingly created weights applied to the reference signal decrease, however are limited by the predetermined minimum leakage factor $\lambda_{Min}(f)$ and unless the adaptation process counteracts, which it does if a sufficiently high level of the noise in the particular frequency range exists. Otherwise the filter coefficients change in a manner such that the accordingly created weights applied to the reference signal also decrease to the effect that in the frequency range, in which, due to the waterbed effect, higher levels of unwanted sound might be expected, such unwanted sounds are attenuated by the lower weights.

Alternatively or additionally, leakage may be controlled dependent on (the weight established by) the filter coefficients. For example, leakage may only be applied if (the weight established by) the filter coefficients exceeds a predetermined threshold or predetermined thresholds.

Another exemplary implementation of leakage control comprises continuously monitoring whether the ANC system generates unwanted sound in certain frequency ranges or not. If such generation of unwanted sound is detected, e.g., because the ANC system has become instable or a reference signal with a smaller dynamic range that is noisy or disturbed due to an acceleration is amplified too much by the respective noise control filter, leakage may be applied to these certain frequency ranges.

Figure 6:
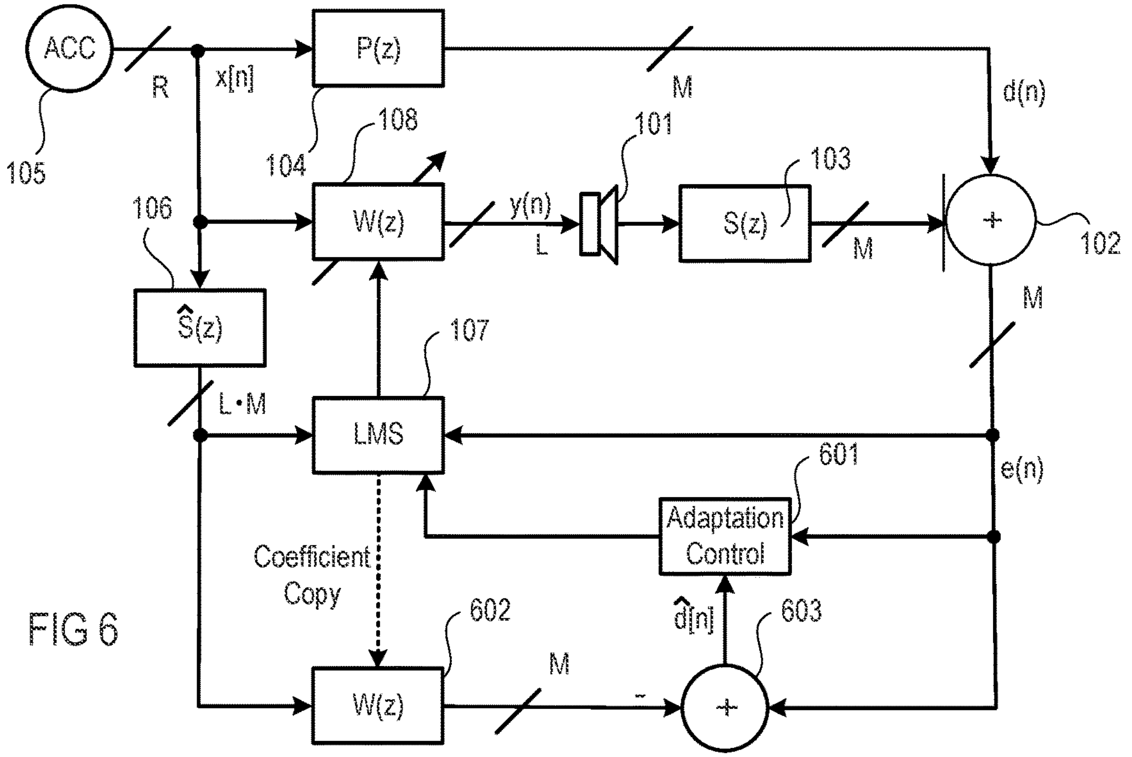
FIG. 6 is a schematic diagram illustrating the ANC system shown in FIG. 1 with an additional leakage controller.

As depicted in FIG. 6, an adaptation controller 601, an additional noise control filter 602 and a subtractor 603 are added to the ANC system shown in FIG. 1 (when assuming L=1, M=1, and R=1). The adaptation controller 601 is connected to receive the respective error signal e[n] from microphone 102 and an estimated disturbing signal $\hat{d}$[n] output by subtractor 603. The subtractor 603 is connected to receive the respective error signals e[n] from microphone 102 and an output signal from the additional noise control filter 602. The additional noise control filter 602 is connected to receive the filtered reference signal from the corresponding secondary path modeling filter 106 and copies of the coefficients of the corresponding noise control filter 108 through filter controller 107. The filter controller 107 is additionally connected to receive from the adaptation controller 601 a control signal for controlling the filter coefficients of the noise control filter 107.

The additions to FIG. 1 described above in connection with FIG. 6 serve to detect unwanted sound generated by the respective noise control filter 108 and to control the noise control filter 108 to refrain from generating the unwanted sound. To this end, a "real" microphone signal, i.e., a microphone signal derived when the noise control filter 108 is active, is (spectrally) compared to a "virtual" microphone signal, i.e., a microphone signal derived when the noise control filter 108 is not active. When the noise control filter 108 is active, the microphone signal required is the error signal e[n] provided by the microphone 102. When the noise control filter 108 is not active, the error signal e[n] cannot be used as it is and, therefore, is simulated, i.e., generated artificially, based on the current error signal e[n]. As the error signal e[n], when the noise control filters 108 are not active, contains no sound provided by noise control filter 108, i.e., no anti-noise, the anti-noise is modelled by the secondary path modeling filter 106 and the additional noise control filter 602 based on the reference signal x[n], and is then subtracted from the current error signal e[n], i.e., the error signal e[n] that contains no anti-noise. Thus, the adaptation controller 601 (e.g., continuously) compares the microphone signal (most recently) picked up when the noise control filter 108 is active, i.e., error signal e[n], with the (most recently) simulated microphone signal, i.e., an estimated disturbing signal $\hat{d}$[n].

For example, if e[n]>TH·$\hat{d}$ [n], wherein TH is an optional threshold, which means a microphone signal at the time when the corresponding noise control filter 108 is active, i.e., the error signal e[n], is greater than the product of the threshold TH and a microphone signal at the time when the corresponding noise control filter 108 i.e., the estimated disturbing signal $\hat{d}$[n], is not active, then leakage is applied. Optionally, this analysis may be performed per frequency, e.g., for a multiplicity of subsequent frequency ranges so that leakage is only applied in those frequency ranges in which the above requirement is met. The leakage may vary and may be, for example, dependent on the difference between the error signal e[n] and the estimated disturbing signal $\hat{d}$[n], i.e., the higher the unwanted sound the higher the leakage, wherein the leakage is automatically controlled similarly to automatic gain controlled amplifiers. For this purpose, the leakage is increased until the error signal e[n] (in the respective frequency range) commences to decrease and approaches the estimated disturbing signal $\hat{d}$[n], but does not undercut it. If the error signal e[n] undercuts the corresponding estimated disturbing signal $\hat{d}$[n], the leakage will be too great and it will not be possible to recognize when the generation of the unwanted sound ceases. Thus, the leakage is controlled so that e[n]=TH·$\hat{d}$[n].

The adaptation controller 601, the additional noise control filter 602 and the subtractor 603 embody a leakage controller that evaluates the type of noise situation and adapts the leakage of the noise control transfer function to the evaluated noise situation. Other ways of controlling leakage, for example the various options outlined above, can be additionally or alternatively implemented in the leakage controller.

Figure 7:
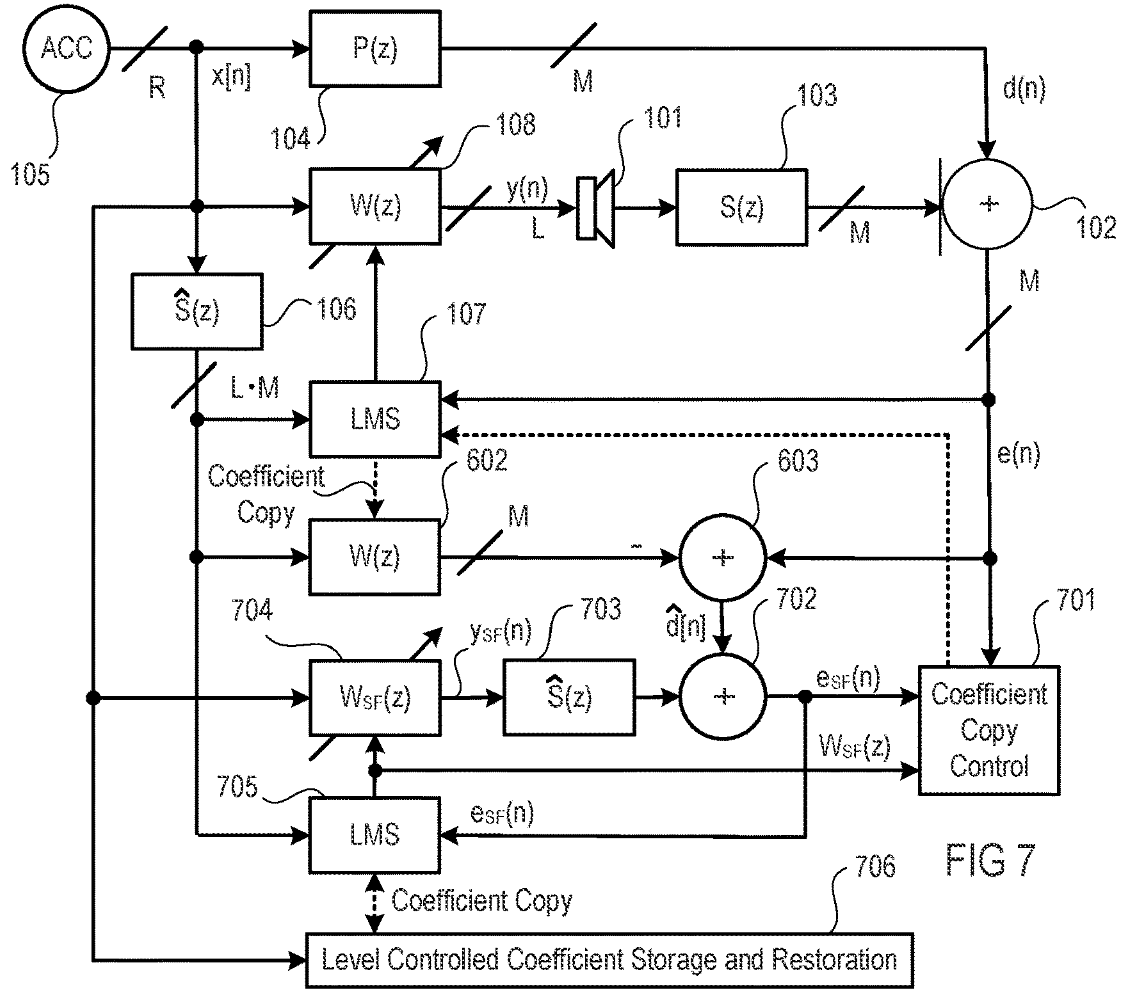
FIG. 7 is a schematic diagram illustrating the ANC system shown in FIG. 6 altered and with a shadow filter.

Referring to FIG. 7, in another implementation the adaptation controller 601 of the ANC system shown in FIG. 6 is replaced by a shadow filter arrangement. The shadow filter arrangement includes a coefficient copy controller 701, which is connected to receive the error signal e[n], a shadow filter coefficient set $W_{SF}(z)$ and a shadow filter error signal $e_{SF}[n]$, which is connected to send or to not send the shadow filter coefficient set $W_{SF}(z)$ to the filter controller 107 under control of the coefficient copy controller 701. The shadow filter error signal $e_{SF}[n]$ is provided by an adder 702, which is connected to receive the signal $\hat{d}$[n], and an output signal of an additional secondary path modeling filter 703 that has a transfer function $\hat{S}(z)$ that models the secondary path transfer function S(z). The additional secondary path modeling filter 703 is connected to receive a signal $y_{SF}[n]$ from a shadow filter 704 that has the shadow filter transfer function $W_{SF}(z)$ and that is connected to receive and filter with the shadow filter transfer function $W_{SF}(z)$ the reference signal(s) x(n) from the R accelerometers 105. The shadow filter 704 is further connected to be controlled by a filter controller 705 that is connected to receive the filtered reference signal from the secondary path modeling filter 106 and the shadow filter error signal $e_{SF}[n]$ from adder 702. A level-controlled coefficient storage and restoration controller 706 is connected to receive the reference signal x[n] and configured to control the copying of coefficients from the level controlled coefficient storage and restoration controller 706 to the filter controller 705 and vice versa.

As can be seen from FIG. 7, the filter coefficients that implement the shadow filter transfer function $W_{SF}(z)$ are copied from the shadow filter 704 into the noise control filter 108 (and the additional noise control filter 602) when better results can be achieved with the coefficients of the shadow filter 704, i.e., when the error signal $e_{SF}[n]$ is smaller than the error signal e[n]. Optionally, in addition and as described above in connection with FIG. 2, one or more sets of filter coefficients may be stored, e.g., on a regular basis, in a memory (not shown in FIG. 7) and may be copied from the memory into the shadow filter 704 and, as the case may be, into the noise control filter 108 (and the additional noise control filter 602) if a change in the noise situation is detected or in any other appropriate event, e.g., when the level of the reference signal x[n] is within a predetermined level range.

To avoid multiple switching between different detected noise situations, e.g., at the range limits, a hysteresis function may be applied. The stored sets of predetermined filter coefficients may, for example, represent commonly occurring noise situations, or may be previously adapted sets for specific or similar noise situations. The selection of the stored sets of predetermined filter coefficients that are actually copied into the noise control filters 108 may be dependent on or independent from the detected noise situation. Alternatively or additionally, leakage (not shown in FIG. 7) may be applied to the ANC system depicted in FIG. 7, which is, however, identical or similar to the leakage function and implementation described above in connection with FIG. 6. The system shown in FIG. 7 not only overcomes the drawbacks described in the background section above, but also allow to detect instabilities of ANC systems. Further, an amplification of signals from the acceleration sensor(s) may be chosen to adapt the bias point of the acceleration sensor(s) to the ANC system.

Although the system shown in FIG. 7 is based on the system shown in FIG. 6, it can also be based on the system shown in FIG. 1. The system shown in FIG. 2 may be combined with the systems shown in FIGS. 6 and 7.

Figure 8:
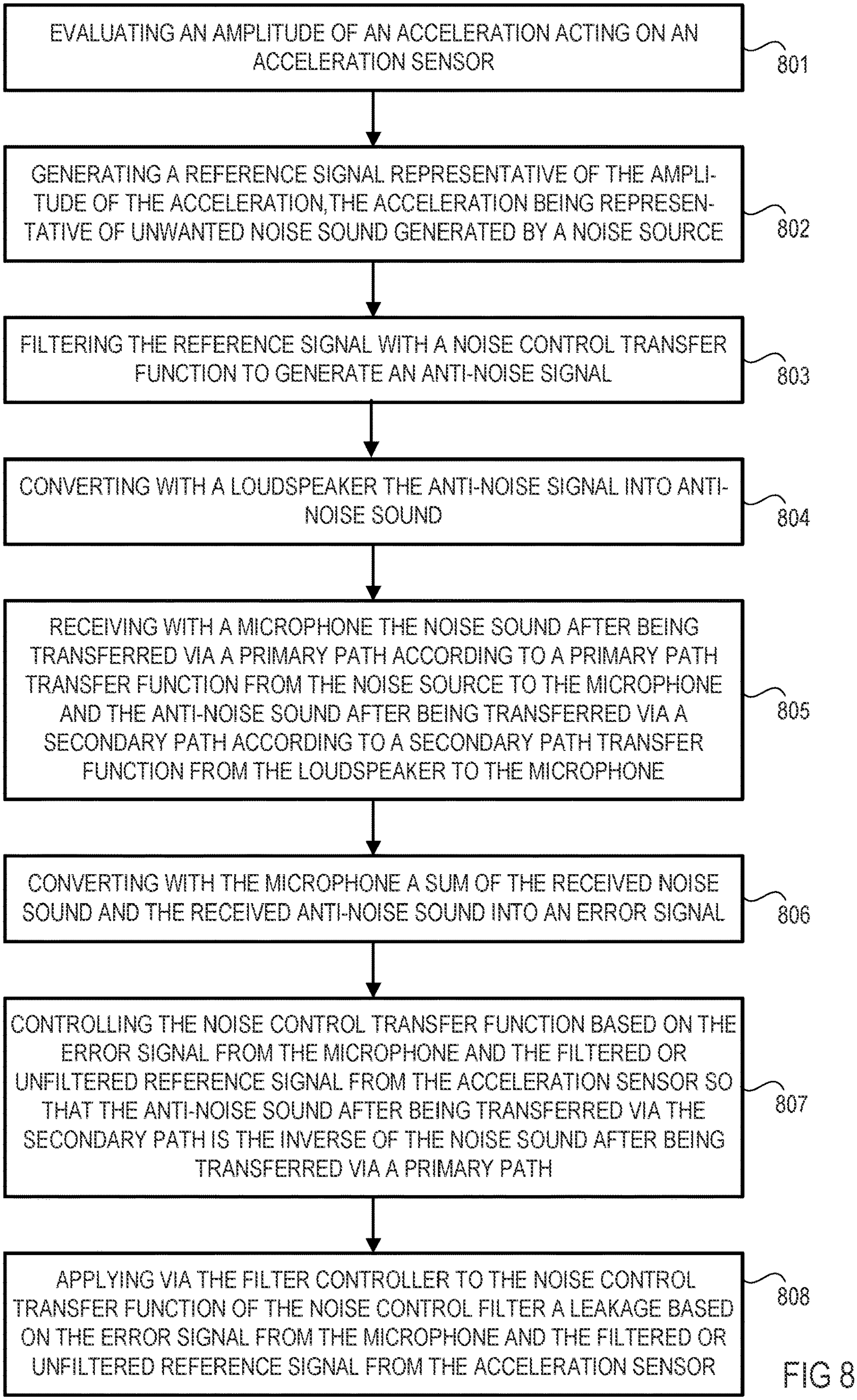
FIG. 8 is a flow chart illustrating an exemplary method for automatic noise control.

FIG. 8 illustrates an exemplary automatic noise control method that includes evaluating an amplitude of an acceleration acting on an acceleration sensor (process 801) and generating a reference signal representative of the amplitude of the acceleration (process 802), the acceleration being representative of unwanted noise sound generated by a noise source, filtering the reference signal with a noise control transfer function to generate an anti-noise signal (process 803), and converting with a loudspeaker the anti-noise signal into anti-noise sound (process 804). The method further includes receiving with a microphone the noise sound after being transferred via a primary path according to a primary path transfer function from the noise source to the microphone and the anti-noise sound after being transferred via a secondary path according to a secondary path transfer function from the loudspeaker to the microphone (process 805), and converting with the microphone a sum of the received noise sound and the received anti-noise sound into an error signal (process 806). The method further includes controlling the noise control transfer function based on the error signal from the microphone and the filtered or unfiltered reference signal from the acceleration sensor so that the anti-noise sound after being transferred via the secondary path is the inverse of the noise sound after being transferred via a primary path (process 807), and applying via the filter controller to the noise control transfer function of the noise control filter a leakage based on the error signal from the microphone and the filtered or unfiltered reference signal from the acceleration sensor (process 808).

The method described above may be encoded in a computer-readable medium such as a CD ROM, disk, flash memory, RAM or ROM, an electromagnetic signal, or other machine-readable medium as instructions for execution by a processor. Alternatively or additionally, any type of logic may be utilized and may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The method may be implemented by software and/or firmware stored on or in a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. An automatic noise control system comprising:

an acceleration sensor configured to evaluate an amplitude of an acceleration acting thereon and to generate a reference signal representative of the amplitude of the acceleration, the acceleration being representative of unwanted noise sound generated by a noise source;

a noise control filter operatively coupled with the acceleration sensor and configured to filter the reference signal with a noise control transfer function to generate an anti-noise signal;

a loudspeaker operatively coupled with the noise control filter and configured to convert the anti-noise signal into anti-noise sound;

a microphone configured to receive a noise sound after being transferred via a primary path according to a primary path transfer function from the noise source to the microphone and the anti-noise sound after being transferred via a secondary path according to a secondary path transfer function from the loudspeaker to the microphone, and further configured to convert a sum of the received noise sound and the received anti-noise sound into an error signal;

a filter controller operatively coupled with the noise control filter, the microphone and the acceleration sensor, and configured to control the noise control transfer function of the noise control filter based on the error signal from the microphone and the filtered reference signal or the unfiltered reference signal from the acceleration sensor so that the anti-noise sound after being transferred via the secondary path is the inverse of the noise sound after being transferred via the primary path; and a leakage controller operatively coupled with the filter controller, the acceleration sensor, and the microphone, and configured to apply via the filter controller to the noise control transfer function of the noise control filter a leakage based on the error signal from the microphone and the filtered reference signal or the unfiltered reference signal from the acceleration sensor, wherein the leakage controller comprises:

an additional noise control filter operatively coupled with the acceleration sensor and configured to filter the filtered reference signal or the unfiltered reference signal from the acceleration sensor with a transfer function that is identical with the noise control transfer function of the noise control filter to generate an additional anti-noise signal;

a subtractor operatively coupled with the additional noise control filter and the microphone, and configured to subtract the additional anti-noise signal provided by the additional noise control filter based on the error signal provided by the microphone to generate an estimated disturbing signal, the estimated disturbing signal being an estimation of a disturbing sound, which is the noise sound after being transferred via the primary path from the noise source to the microphone; and an adaptation controller operatively coupled with the filter controller and the microphone, and configured to compare the error signal with the estimated disturbing signal and to control the filter controller to apply the leakage dependent on the comparison.

2. The automatic noise control system of claim 1, wherein the adaptation controller is further configured to apply the leakage if the error signal is greater than the product of the estimated disturbing signal and a threshold.

3. The automatic noise control system of claim 1, wherein the adaptation controller is further configured to control an amount of the leakage applied dependent on a difference between the error signal and the estimated disturbing signal.

4. The automatic noise control system of claim 3, wherein the adaptation controller is further configured to control the amount of the leakage so that the error signal is equal to the estimated disturbing signal.

5. The automatic noise control system of claim 1, wherein the adaptation controller is further configured to perform the comparison in each of a multiplicity of frequency ranges.

6. The automatic noise control system of claim 1, further comprising a secondary path modeling filter that is connected between the acceleration sensor and at least one of the filter controller and leakage controller, and configured to filter the reference signal with the secondary path transfer function before it is provided to the filter controller and the leakage controller.

7. An automatic noise control method comprising:

evaluating an amplitude of an acceleration acting on an acceleration sensor and generating a reference signal representative of the amplitude of the acceleration, the acceleration being representative of unwanted noise sound generated by a noise source;

filtering the reference signal with a noise control transfer function to generate an anti-noise signal;

converting with a loudspeaker the anti-noise signal into anti-noise sound;

receiving with a microphone the noise sound after being transferred via a primary path according to a primary path transfer function from the noise source to the microphone and the anti-noise sound after being transferred via a secondary path according to a secondary path transfer function from the loudspeaker to the microphone, and converting with the microphone a sum of the received noise sound and the received anti-noise sound into an error signal;

controlling the noise control transfer function based on the error signal from the microphone and the filtered reference signal or the unfiltered reference signal from the acceleration sensor so that the anti-noise sound after being transferred via the secondary path is the inverse of the noise sound after being transferred via the primary path;

applying via the filter controller to the noise control transfer function of the noise control filter a leakage based on the error signal from the microphone and the filtered reference signal or the unfiltered reference signal from the acceleration sensor;

filtering the filtered reference signal or the unfiltered reference signal from the acceleration sensor with a transfer function that is identical with the noise control transfer function of the noise control filter to generate an additional anti-noise signal;

subtracting the additional anti-noise signal provided by the additional noise control filter from the error signal provided by the microphone to generate an estimated disturbing signal, the estimated disturbing signal being an estimation of a disturbing sound, which is the noise sound after being transferred via the primary path from the noise source to the microphone; and comparing the error signal with the estimated disturbing signal and controlling the filter controller to apply the leakage dependent on the comparison.

8. The automatic noise control method of claim 7, further comprising applying leakage if the error signal is greater than the product of the estimated disturbing signal and a threshold, and otherwise applying no leakage.

9. The automatic noise control method of claim 8, further comprising controlling an amount of leakage applied dependent on the difference between the error signal and the estimated disturbing signal.

10. The automatic noise control method of claim 9, further comprising controlling the amount of leakage applied based on the error signal being equal to the estimated disturbing signal.

11. The automatic noise control method of claim 7, further comprising performing the comparison in each of a multiplicity of frequency ranges.

12. The automatic noise control method of claim 7, further comprising filtering the reference signal with the secondary path transfer function before at least one of controlling the noise control transfer function and controlling leakage.

13. A system, comprising:

a processor comprising instructions stored on memory thereof that cause the processor to:

evaluate an amplitude of an acceleration acting on an acceleration sensor and generating a reference signal representative of the amplitude of the acceleration, the acceleration being representative of unwanted noise sound generated by a noise source;

filter the reference signal with a noise control transfer function to generate an anti-noise signal;

convert with a loudspeaker the anti-noise signal into anti-noise sound;

receive with a microphone the noise sound after being transferred via a primary path according to a primary path transfer function from the noise source to the microphone and the anti-noise sound after being transferred via a secondary path according to a secondary path transfer function from the loudspeaker to the microphone, and converting with the microphone a sum of the received noise sound and the received anti-noise sound into an error signal;

control the noise control transfer function based on the error signal from the microphone and the filtered reference signal or the unfiltered reference signal from the acceleration sensor so that the anti-noise sound after being transferred via the secondary path is the inverse of the noise sound after being transferred via the primary path;

apply via the filter controller to the noise control transfer function of the noise control filter a leakage based on the error signal from the microphone and the filtered reference signal or the unfiltered reference signal from the acceleration sensor;

filter the filtered reference signal or the unfiltered reference signal from the acceleration sensor with a transfer function that is identical with the noise control transfer function of the noise control filter to generate an additional anti-noise signal;

subtract the additional anti-noise signal provided by the additional noise control filter from the error signal provided by the microphone to generate an estimated disturbing signal, the estimated disturbing signal being an estimation of a disturbing sound, which is the noise sound after being transferred via the primary path from the noise source to the microphone; and compare the error signal with the estimated disturbing signal and controlling the filter controller to apply the leakage dependent on the comparison.

* * * * *